(12) United States Patent
Sanders et al.

(10) Patent No.: US 10,635,058 B2
(45) Date of Patent: Apr. 28, 2020

(54) MICROGRID CONTROLLER FOR DISTRIBUTED ENERGY SYSTEMS

(71) Applicant: Sunverge Energy, Inc., San Francisco, CA (US)

(72) Inventors: Dean Sanders, Linden, CA (US); Stu Statman, San Francisco, CA (US)

(73) Assignee: Sunverge Energy, Inc., San Francisco, CA (US)

( * ) Notice: Subject to any disclaimer, the term of this patent is extended or adjusted under 35 U.S.C. 154(b) by 0 days.

(21) Appl. No.: 16/125,413

(22) Filed: Sep. 7, 2018

(65) Prior Publication Data
US 2019/0286080 A1    Sep. 19, 2019

Related U.S. Application Data

(63) Continuation of application No. 15/197,537, filed on Jun. 29, 2016, now abandoned, which is a
(Continued)

(51) Int. Cl.
*G05B 15/02* (2006.01)
*G05B 11/01* (2006.01)
(Continued)

(52) U.S. Cl.
CPC .......... *G05B 15/02* (2013.01); *H02J 13/0079* (2013.01); *H02J 3/382* (2013.01); *Y02E 60/7869* (2013.01); *Y04S 40/128* (2013.01)

(58) Field of Classification Search
CPC .. G05B 15/02; H02J 13/0006; H02J 13/0079; H02J 15/00; H02J 3/14; H02J 3/32;
(Continued)

(56) References Cited

U.S. PATENT DOCUMENTS

| 8,457,797 B2 | 6/2013 | Imes et al. |
| 8,682,495 B2 | 3/2014 | Carralero et al. |

(Continued)

FOREIGN PATENT DOCUMENTS

| WO | WO 2014164976 | 10/2014 |
| WO | WO 2015017201 | 2/2015 |

OTHER PUBLICATIONS

Extended European Search Report and Written Opinion issued by the European Searching Authority dated Feb. 25, 2019 for EP Application No. EP 16821841. pp. 1-19.
(Continued)

*Primary Examiner* — Abdelmoniem I Elamin
(74) *Attorney, Agent, or Firm* — Haynes and Boone, LLP

(57) ABSTRACT

A microgrid controller for controlling one or more edge units in a distributed energy system is presented. In some embodiments, the microgrid controller communicates with one or more network adjacent edge units, each of the one or more network adjacent edge units being coupled to a power grid, determines an instruction set to execute with the one or more network adjacent edge units, provides operating parameters for the one or more network adjacent edge units to execute the instruction set, and monitors the one or more edge units over a network that is not associated with the internet. In situations where the internet fails, microgrid controller determines a set of instructions to execute and provides instructions to the network adjacent edge units.

20 Claims, 8 Drawing Sheets

Related U.S. Application Data continuation of application No. 14/791,420, filed on Jul. 4, 2015, now Pat. No. 9,960,637.

(51) Int. Cl.
*H02J 13/00* (2006.01)
*H02J 3/38* (2006.01)

(58) Field of Classification Search
CPC .. H02J 3/381; H02J 3/382; H02J 3/383; H02J 7/35; Y02B 70/3225; Y02E 10/563; Y02E 60/721; Y02E 70/30; Y04S 20/222; Y04S 40/128
See application file for complete search history.

(56) References Cited

U.S. PATENT DOCUMENTS

| | | | |
|---|---|---|---|
| 8,855,829 B2 | 10/2014 | Golden et al. | |
| 8,918,225 B2* | 12/2014 | Lazaris | H02J 3/382 290/44 |
| 8,965,590 B2 | 2/2015 | Boardman et al. | |
| 9,094,385 B2 | 7/2015 | Akyol et al. | |
| 9,136,732 B2 | 9/2015 | Wolter | |
| 9,172,249 B2 | 10/2015 | Rockenfeller et al. | |
| 9,188,109 B2* | 11/2015 | Lazaris | F03G 6/00 |
| 9,263,894 B2* | 2/2016 | Robinett, III | H02J 3/38 |
| 9,529,349 B2 | 12/2016 | Marti et al. | |
| 9,576,472 B2 | 2/2017 | Koch | |
| 9,641,026 B2 | 5/2017 | Boardman et al. | |
| 9,722,813 B2 | 8/2017 | Benes et al. | |
| 9,733,623 B2 | 8/2017 | Yang et al. | |
| 9,795,048 B2 | 10/2017 | Simonelli et al. | |
| 9,853,488 B2 | 12/2017 | Fincham et al. | |
| 9,881,033 B2 | 1/2018 | Boardman et al. | |
| 2004/0024502 A1 | 2/2004 | Squires et al. | |
| 2004/0030457 A1 | 2/2004 | Bayoumi et al. | |
| 2004/0167677 A1 | 8/2004 | Weiss | |
| 2006/0158037 A1 | 7/2006 | Danley et al. | |
| 2008/0167756 A1 | 7/2008 | Golden et al. | |
| 2009/0088907 A1 | 4/2009 | Lewis et al. | |
| 2009/0276488 A1 | 11/2009 | Alstad | |
| 2010/0017249 A1 | 1/2010 | Fincham et al. | |
| 2011/0046800 A1 | 2/2011 | Imes et al. | |
| 2011/0106321 A1 | 5/2011 | Cherian et al. | |
| 2012/0101639 A1 | 4/2012 | Carralero et al. | |
| 2012/0130556 A1 | 5/2012 | Marhoefer | |
| 2012/0232709 A1* | 9/2012 | Robinett, III | H02J 3/38 700/286 |
| 2012/0310434 A1 | 12/2012 | Taft | |
| 2012/0310559 A1 | 12/2012 | Taft | |
| 2013/0015703 A1 | 1/2013 | Rouse et al. | |
| 2013/0036311 A1 | 2/2013 | Aykol et al. | |
| 2013/0041516 A1 | 2/2013 | Rockenfeller | |
| 2014/0218209 A1 | 8/2014 | Koch | |
| 2015/0039145 A1 | 2/2015 | Yang et al. | |
| 2015/0105924 A1* | 4/2015 | Lazaris | H02J 3/382 700/287 |
| 2015/0105928 A1* | 4/2015 | Lazaris | H02J 3/382 700/295 |
| 2015/0127180 A1 | 5/2015 | Oh et al. | |
| 2015/0127685 A1 | 5/2015 | Boardman et al. | |
| 2015/0134135 A1 | 5/2015 | Wong et al. | |
| 2015/0254787 A1 | 9/2015 | Eger et al. | |
| 2015/0318706 A1 | 11/2015 | Ilinca et al. | |
| 2016/0020728 A1 | 1/2016 | Wolter | |
| 2016/0072289 A1* | 3/2016 | Lazaris | G06Q 30/0605 700/287 |
| 2017/0126012 A1 | 5/2017 | Grebel et al. | |
| 2017/0160711 A1 | 6/2017 | Wong et al. | |

OTHER PUBLICATIONS

International Search Report for PCT Application No. PCT/US2016/040530 issued by the US Searching Authority dated Sep. 14, 2016, pp. 1-2.
Written Opinion for PCT Application No. PCT/US2016/040530 issued by the US Searching Authority dated Sep. 14, 2016, pp. 1-10.
International Search Report for PCT Application No. PCT/US2016/040540 issued by the US Searching Authority dated Sep. 15, 2016, pp. 1-2.
Written Opinion for PCT Application No. PCT/US2016/040540 issued by the US Searching Authority dated Sep. 15, 2016, pp. 1-4.
International Search Report for PCT Application no. PCT/US2016/040545 issued by the US Searching Authority dated Sep. 26, 2016, pp. 1-2.
Written Opinion for PCT Application No. PCT/US2016/040545 issued by the US Searching Authority dated Sep. 26, 2016, pp. 1-7.
Zadeh, M.R.D.; A. Hajimiragha; M. Adamiak; A. Palizban; and S. Allan, "Design and implementaion of a microgrid controller," In Protective Relay Engineers, 2011 $64^{th}$ Annual Conference, pp. 137-145, IEEE, 2011.
Liu, Hai-xuan, "Studies on the monitoring and control platform of microgrids," In Electricity Distribution (CICED), China International Conference on, pp. 1-5, IEEE, 2012.
Gomis-Bellmnt, Oriol, Andreas Sumper, Alba Colet-Subirachs, Albert Ruiz-Alvarez, Felipe Alvarez-Cuevas-Figuerola, and Antoni-Sudria-Andreu, "A utility connected microgrid based on power emulators," In Power and Energy Society General Meeting, pp. 1-6, IEEE 2011.
Dimeas et al., "Microgrids Control Issues," In: "Microgrids" Dec. 26, 2013, John Wiley and Sons, Ltd., Chichester, United Kingdom, pp. 25-80.
European Search Report from European Patent Application No. 16821840.2, dated Mar. 22, 2019, pp. 1-11.
European Search Report from European Patent Application No. 16821841.0, dated Feb. 20, 2019, pp. 1-10.
European Search Report from European Patent Application No. 16821842.8, dated Mar. 29, 2019, pp. 1-9.
International Preliminary Report on Patentability from PCT/US2016/040530, dated Jan. 9, 2018, pp. 1-6.
International Preliminary Report on Patentability from PCT/US2016/040540, dated Jan. 9, 2018, pp. 1-5.
International Preliminary Report on Patentability from PCT/US2016/040545, dated Jan. 9, 2018, pp. 1-8.
Marra et al., "Implementation of an Electric Vehicle Test Bed Controlled by a Virtual Power Plant for Contributing to Regulating Power Reserves," 2012 IEEE Power and Energy Society General Meeting, San Diego, CA, Jul. 22-26, 2012, IEEE, Piscataway, NJ, Jul. 22, 2012, pp. 1-7.
Raab et al. "Virtual Power Plant Control Concepts with Electric Vehicles," Intelligent System Application to Power Systems (ISAP), 2011 16th International Conference on, IEEE, Sep. 25, 2011, pp. 1-6.
Zadeh et al. "Design and Implementation of a Microgrid Controller," Protective Relay Engineers, 2011 64th Annual Conference for IEEE, Apr. 11, 2011, pp. 137-145.
U.S. Appl. No. 14/791,420, filed Jul. 4, 2015, U.S. Pat. No. 9,960,637, May 1, 2018.
U.S. Appl. No. 15/197,526, filed Jun. 29, 2016.
U.S. Appl. No. 15/197,459, filed Jun. 29, 2016.
U.S. Appl. No. 15/197,537, filed Jun. 29, 2016.

* cited by examiner of the power grid may operate with the power grid in a load shifting or load flattening mode in order to better utilize the power received from the grid.

As a result of multiple factors, including the increasing popularity of electric vehicles and the availability of an advanced metering infrastructure, the costs of implemented distributed power systems are decreasing and interests in distributed power systems is increasing. As these systems develop, there is an increasing interest in coordinating such distributed energy systems for better utilization.

Therefore, there is a need to develop better organizations for distributed energy systems.

MICROGRID CONTROLLER FOR DISTRIBUTED ENERGY SYSTEMS

RELATED APPLICATIONS

The present application is a continuation of U.S. patent application Ser. No. 15/197,537, filed Jun. 29, 2016, which is a continuation of U.S. patent application Ser. No. 14/791,420, filed on Jul. 4, 2015, now U.S. Pat. No. 9,960,637, issued on May 1, 2018, entitled "Renewable Energy Integrated Storage and Generation Systems, Apparatus, and Methods with Cloud Distributed Energy Management Services," by Dean Sanders and Stu Statman, each of which is herein incorporated by reference in its entirety.

TECHNICAL FIELD

Embodiments generally related to controlling a collection of distributed energy systems and, in particular, to a microgrid controller for aggregating distributed energy systems.

DISCUSSION OF RELATED ART

There exists a number of site specific energy generation and back-up systems, often associated with individual commercial, residential sites, or field locations in current use or which are being developed for use. There exist several technologies that can produce electricity at a particular location. Such technologies include, for example, photovoltaic panels (e.g., solar panels); small scale natural gas turbines (also known as micro-turbines); small-scale wind turbines (in contrast to the large turbines used in grid connected wind farms); low pressure water turbines; high-pressure low flow water turbines; fuel cells using hydrogen, natural gas, and potentially other hydrocarbons; geothermal sources; energy scavenging devices; or conventional diesel, natural gas, gasoline, or other hydrocarbon generators. These technologies, used on residential, commercial, or other sites, can be referred to as "distributed energy sources." Distributed energy sources have been deployed only to a very limited extent for reasons of cost, convenience, and a lack of harmonized grid inter-connection standards. Historically, power storage and supply devices typically involve the charging of batteries that store energy in the event of a power failure of a main source of electricity at a particular site. Typically, the main source of power for a particular site is a utility power grid connected to the site (e.g. home or business), which is often designed to support the entire or selected electrical load required by a particular site. As a result, residential and commercial power storage and supply devices may be large and cumbersome. In some cases, the power storage and supply devices store the electric power produced by an alternative energy source and may even supply power to a utility power grid, in essence operating as a small, distributed power generation plant.

Such distributed power systems often provide back-up power for the established electrical grid to which it is attached and may include combinations of energy storage and energy generation. As discussed above, energy generation can include fueled generators (e.g., diesel, gasoline, natural gas, hydrogen, or generators using other fuels) as well as renewable (e.g., solar, wind, water, etc.). Storage can include battery storage from any available battery technology or other forms of mechanical storage (e.g., pumping of water to later be used in a water driven turbine). These distributed power systems may also receive and store power from the grid itself. Distributed power systems coupled to

SUMMARY

In accordance with aspects of the presents a microgrid controller for controlling one or more edge units. In some embodiments, a method of operating as a microgrid controller includes communicating with one or more network adjacent edge units, each of the one or more network adjacent edge units being coupled to a power grid; determining an instruction set to execute with the one or more network adjacent edge units; providing operating parameters for the one or more network adjacent edge units to execute the instruction set; and controlling and monitoring the one or more edge units.

A microgrid controller according to some embodiments includes a processor; a memory coupled to the processor; an internet interface coupled to the processor, the internet interface configured to communicate through an internet to receive instruction sets; and a device interface coupled to the processor, the device interface configured to communicate with one or more network adjacent edge units. The processor executes instructions for communicating with the one or more network adjacent edge units through the device interface, each of the one or more network adjacent edge units being coupled to a power grid; determining an instruction set to execute with the one or more network adjacent edge units; providing operating parameters for the one or more network adjacent edge units to execute the instruction set; and controlling and monitoring the one or more edge units.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
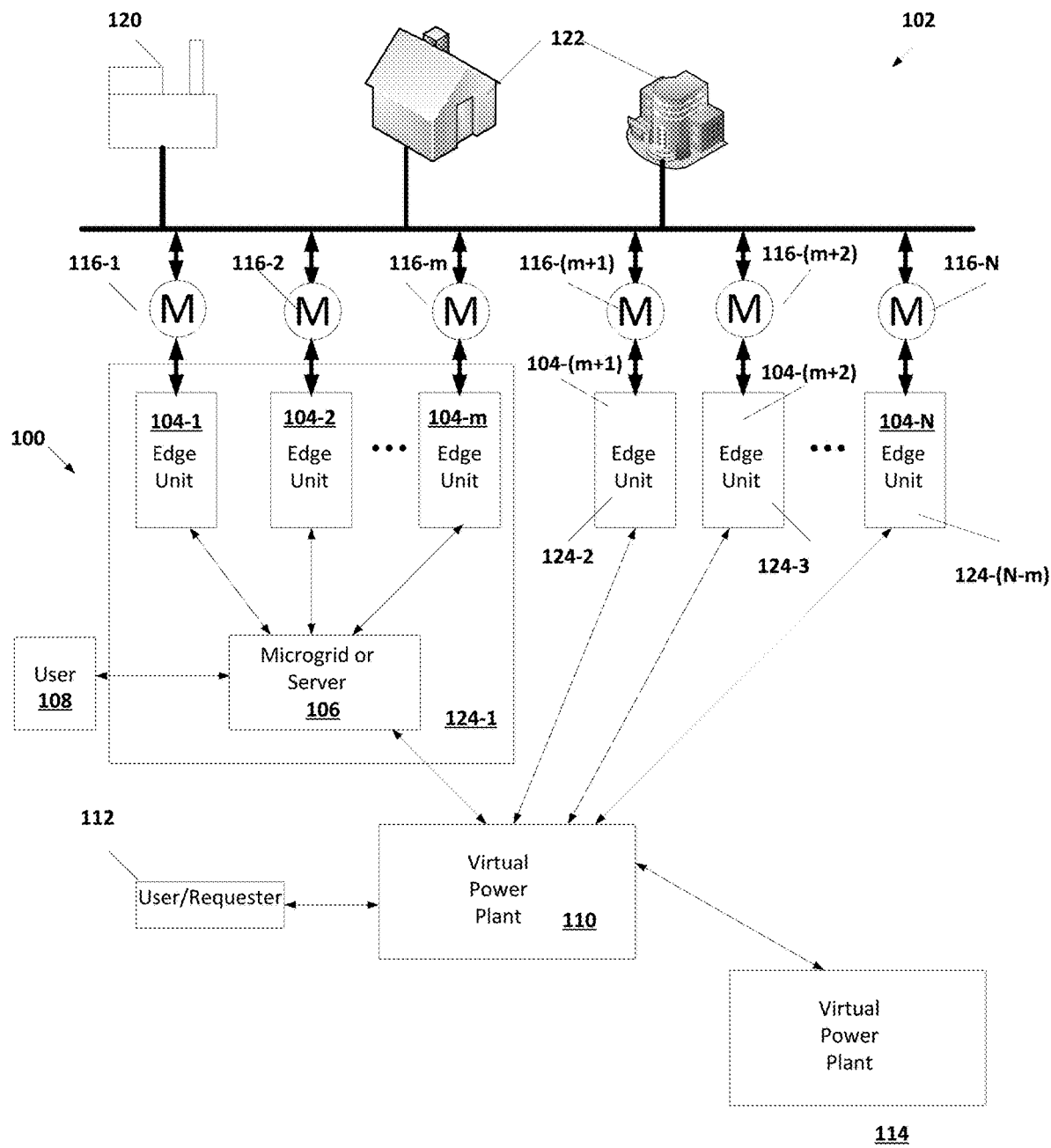
FIG. 1 illustrates an example of a power distribution system.

FIG. 1 illustrates an example power system 100 according to some embodiments. Power system 100 is an example of a group of distributed energy systems (DESs), shown as edge units 104-1 through 104-N, that are each separately coupled to a power grid 102. Although power grid 102 is illustrated as a solid line, it should be understood that there may be multiple branches onto which edge units 104-1 through 104-N are coupled. As such, power system 100 includes a plurality of edge units 104 (edge units 104-1 through 104-N are illustrated in FIG. 1). Edge units 104-1 through 104-N may be geographically separated and may each be associated with different residences, businesses, other establishments, or individual use sites.

Each of edge units 104 represents a DES that is coupled to receive and supply power to a power grid 102. In some embodiments, each of edge units 104 can be coupled to power grid 102 through a power meter 116 (power meters 116-1 through 116-N are illustrated in FIG. 1). Power meters 116 are supplied by a power company that controls grid 102 and may, for example, be smart meters. In some embodiments, power meters 116 may receive and send signals to an operator of power grid 102. In some embodiments, power meters 116 may provide signals to edge units 104 that allow control of certain aspects of edge units 104 by a power company through power meters 116.

In general, power grid 102 can be any power distribution system that receives power from power sources and provides power to power users. As shown in FIG. 1, power grid 102 receives power from power sources 120 and supplies power to power users 122. There can be any number of power sources 120 coupled to power grid 102. Power sources 120 can be, for example, commercial power plants including coil-fired plants, hydroelectric plants, geothermal plants, nuclear plants, gas-fired plants, solar production facilities, wind power facilities, individual generators or any other power production facility for the production of power. Furthermore, power system 100 may represent further power generation facilities 120 coupled to power grid 102. As illustrated in FIG. 1, power grid 102 is coupled to edge units 104, each of which may provide power to grid 102 or receive power from grid 102.

As is illustrated in FIG. 1, edge units 104 can be networked by being coupled to a server 106, which may be a microgrid controller according to some embodiments of the present invention, or other network device such as virtual power plant 110, for example. Server 106 can provide monitor and control functions to individual ones of edge units 104, thereby aggregating edge units 104 into a single functional unit. As illustrated in FIG. 1, edge units 104-1 through 104-$m$ are in communication with server 106. Any form of communication, including wired or wireless communications protocols, internet communications, or other networking communications systems can be utilized between server 106 and edge units 104-1 through 104-$m$. If server 106 is a microgrid control according to some embodiments, then server 106 and edge units 104-1 through 104-$m$ are network adjacent, as described further below. As is illustrated in FIG. 1, server 106 may further communicate with a user 108 that may monitor and provide instructions to server 106. In some embodiments, server 106 may be coupled to another server. In general, a server such as server 106 can be coupled to any number of other servers, to any number of individual edge units 104, and to any number of entities such as VPP 110.

In accordance with some embodiments, any number of edge units 104 or servers 106 may also be coupled to a virtual power plant (VPP) 110. VPP 110 provides individual instructions to individual VPP units 124 (units 124-1 through 124-(N–m) are shown in FIG. 1. A VPP unit 124 can be a single one of edge units 104 or may be a group that includes multiple ones of edge units 104. In particular, as shown in FIG. 1, unit 124-1 is formed by server 106 and edge units 104-1 through 104-$m$ while units 124-2 through 124-(N–m) are individual edge units 104-($m$+1) through 104-N.

As shown in FIG. 1, VPP 110 is in communication with server 106 and edge units 104-($m$+1)-104-N. Unit 124-1 is formed by server 106 and edge units 104-1 through 104-$m$ while units 124-2 through 124-(N–m) are formed by edge units 104-($m$+1) through 104-N, respectively. In general, a VPP unit 124 can include any single one of edge units 104 or any collection of edge units 104.

In general, VPP 110 receives power requests from user/requester 112 and, if that request can be satisfied by the resources represented by units 124, VPP 110 instructs units 124 in order to satisfy the power request. User/requester 112 may be, for example, a power company and may include an interface between VPP 110 and computing systems for a power company that controls power grid 102. The operation of a VPP such as VPP 110 is further described in U.S. patent application Ser. No. 15/197,526, which is filed concurrently with the present application and is incorporated herein by reference in its entirety.

As is further illustrated in FIG. 1, VPP 110 may be in communication with another VPP 114. VPP 114 may provide requests to VPP 110 in order to fulfill a request that VPP 114 has received. In some embodiments, when VPP 110 receives a request from VPP 114, VPP 110 may operate similarly to server 106. A requester represents any device or user that provides a request to a VPP such as VPP 110 to store power from or provide power to a power grid 102.

Figure 2:
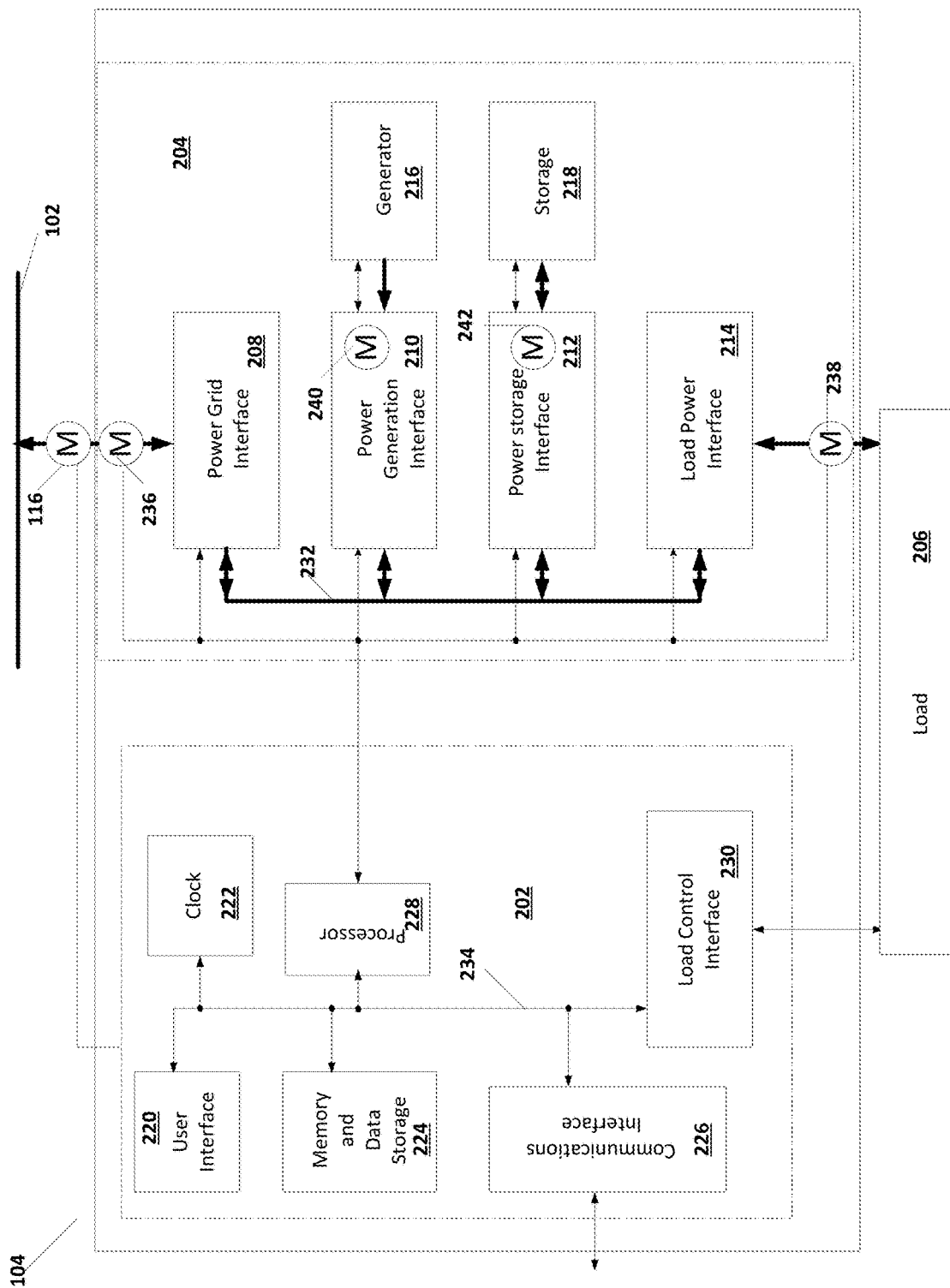
FIG. 2 illustrates an example of an edge unit as shown in FIG. 1.

FIG. 2 illustrates an example of an edge unit 104. As shown in FIG. 2, edge unit 104 includes a power distribution section 204 and a processing unit 202. Processing unit 202 controls and monitors components in power distribution section 204, as well as monitoring environmental properties such as door latches, temperature controls, humidity controls, or other components of edge unit 104. Power distribution section 204 includes interfaces for multiple power handling units. As shown in FIG. 2, power distribution unit 204 includes a power grid interface 208 and one or more of a power generation interface 210, power storage interface 212, and load power interface 214. Power distribution unit 204 can further include a power bus 232 that links each of the power grid interface 208, power generation interface 210, power storage interface 212, and load power interface 214 that are present in power distribution section 204.

Power grid interface 208 transfers power between power grid 102 and power bus 232. When edge unit 104 supplies power to grid 102, power grid interface 208 receives power from bus 232 at an internal power voltage, which is set for edge unit 104, converts the power to be compatible with grid 102, and provides the power to grid 102. In some embodiments, power bus 232 represents one or more individual power busses that each may carry different DC or AC voltages. When edge unit 104 is receiving power from power grid 102, power grid interface 208 converts power from grid 102 to be compatible with an internal voltage of bus 232 that is appropriate for the device that is receiving the power.

Power generation interface 210 interfaces between power generator 216 and power bus 232. Power generator 216 may be any source of power, for example an internal-combustion generator (diesel, gas, natural gas, hydrogen, etc.), fuel cells, solar panels, wind power, hydroelectric, or any other power source. In some embodiments, edge unit 104 may include multiple generators 216, in which case power generation interface 210 will interface any number of individual generators included in generator 216 to power bus 232. Each individual generator in generator 216 may have a dedicated and individual interface circuit in power generation interface 210.

Power storage interface 212 interfaces between an energy storage device 218 and bus 232. Storage device 218 can be any device, or combination of devices, capable of storing energy, for example batteries, mechanical storage devices (compressed air, pumped water, etc.), heat storage device, or other device designed to store energy for future retrieval. Power storage interface 212 then converts the stored energy in storage device 218 to supply power to bus 232. Power storage interface 212 further receives power from bus 232 and stores energy in storage device 218.

Load power interface 214 provides power from bus 232 to a load 206. Load 206 may, for example, be a house, business, apartment complex, telecommunications tower, hospital, or any other power user. In some embodiments, individual components of load 206 can be activated or deactivated by external signals. For example, in a house certain appliances (e.g., hot water heater, air conditioning, etc.) may be enabled or disabled to adjust the use power. Consequently, load 206 may be adjustable. In some embodiments, meter 116 provides signals to control appliances in load 206.

Interfaces 208, 210, 212, and 214 include power circuitry such as power inverters, DC-DC converters, AC-DC converters, and other electronics for power conversion between individual interfaces and between edge unit 104 and power grid 102 or load 206. Interfaces may further include metering systems to accurately monitor power flow throughout unit 104. As shown in FIG. 2, meter 236 can provide accurate measure of power between grid 102 and unit 104, specifically through power grid interface 208. Power meter 238 provides an accurate measure of power through load power interface 214 and load 206. Similarly, power generation interface 210 can include a meter 240 to monitor power flow from generator 216 and power storage interface 212 can include a meter 242 to monitor power flow between bus 232 and storage 218. Power meters 236, 238, 240, and 242 can provide signals to processing unit 202.

The depiction of power distribution section 204 illustrated in FIG. 2 is provided for discussion only. Other configurations may be provided in order to facilitate the transmission and storage of power from individual power sources or energy storage devices to power grid 102 and/or load 206. For example, edge unit 104 may not include certain aspects illustrated in FIG. 2, for example edge unit 104 may not include storage, may not include an interface to a load 106, or may not include any generators 116. Power distribution section 204 can be characterized in terms, for example, of the amount of energy storage capability, the current level of storage available, the charge and discharge characteristics of storage 218, the amount of power generation capable, and the future ability to produce power (e.g., the amount of fuel in a generator, the current production from solar panels or wind generators, the projected production from solar panels, wind generators, and other conditionally dependent sources, or other factors that affect the ability to produce power). As such, each edge unit 104 can be characterized by a set of characterization parameters that describe the storage capabilities and production capabilities of the edge unit 204. Consequently, each VPP unit 124 can be characterized by a set of characterization parameters as well, which may be the aggregated characterization parameters of each of a set of VPP units 104 forming the VPP unit 124.

As illustrated in FIG. 2, power distribution section 204 can provide signals to and be controlled by processor unit 202. Processor unit 202 includes a processor 228. Processor 228 may be coupled through a bus 234 to memory and data storage 224 and user interface 270. Processor 228 can be any processor, microprocessor or series of processors or microprocessors that are capable of executing instructions. Memory and data storage 224 can be any collection of volatile or non-volatile memory, disk drives, read-only media, magnetic drives, or other media for storing data and instructions that can be executed by processor 228. User interface 270 may be any combination of display and user input, may be a port into which a separate device is coupled (e.g., a USB port or other such port), or may be a combination of such so that a user at edge unit 104 may provide local instructions or review the status of edge unit 104. In some embodiments, user interface 220 may also be coupled to receive signals from a smart meter such as meter 116. In some embodiments, a clock 222 may also be coupled to processor 228 through data bus 234 in order to provide accurate timing according to a standard so that all edge units 104 are operating on a uniform time. Clock 222 may, for example, provide accurate times that can be used to activate processes for the production and storage of power within power distribution 204.

Processor 228 is further coupled to a communications interface 226 for communications with other networked devices, for example a server such as server 106 or a VPP such as VPP 110. As such, communications interface 226 may be configured to communicate over a wireless or wired network and may use any communications protocol. In some embodiments, communications interface 226 may communicate with a server 106 or VPP 110 over the internet, e.g. through the internet "cloud," through a wired protocol or through a wireless protocol.

Processor 228 is further coupled to a load control interface 230. Load control interface 230 may provide signals to load 206 that affect the power usage of load 206. For example, in some examples of edge unit 104, load 206 may have appliances that can be remotely activated or deactivated by signals from processor 228 through load control interface 230. The power usage of load 206 may then be controlled, or disabled completely, by processor 228. In some embodiments, processor 228 may turn appliances on and off in load 206 in order to better control the use of power within edge unit 104 and allow edge unit 104 to execute a set of instructions that it receives. Load shifting and load shaping may, for example, be accomplished in edge unit 104 by judiciously enabling or disabling appliances such as, for example, hot water heaters, car chargers, or other appliances in load 206.

As illustrated in FIG. 2, processor unit 202 is coupled to receive and provide signals to power distribution section 204. Processor unit 202 may control power distribution section 204 to route power to power grid 102, to load 206, to provide or halt generation of power from any one of the generators in generator 216, to store energy or receive energy to storage 218. As such, processor unit 202 may provide individual operating parameters to each of the device interfaces 208, 210, 212, and 214 in order to control power input/output from grid 102, power generation from generators 216, power storage from storage 218, or power output to load 206.

Edge unit 104 can be characterized with a set of characteristic parameters and current state parameters that are provided to other components of the network, for example server 106 or VPP 110. The set of characteristic parameters can include, for example, total energy storage, generation capability, types of power generation, fuel levels for power generators, load characteristics, energy storage charging/discharging characteristics, energy storage capacity, efficiency characteristics, parasitic loss characteristics, controllability characteristics of power distribution components, characteristics of load controllability, power dispatch characteristics, power charge characteristics, among other parameters. Current state parameters can include current energy storage, current power generation, current load requirements, current power output to the grid, current loses, and other parameters.

Figure 3:
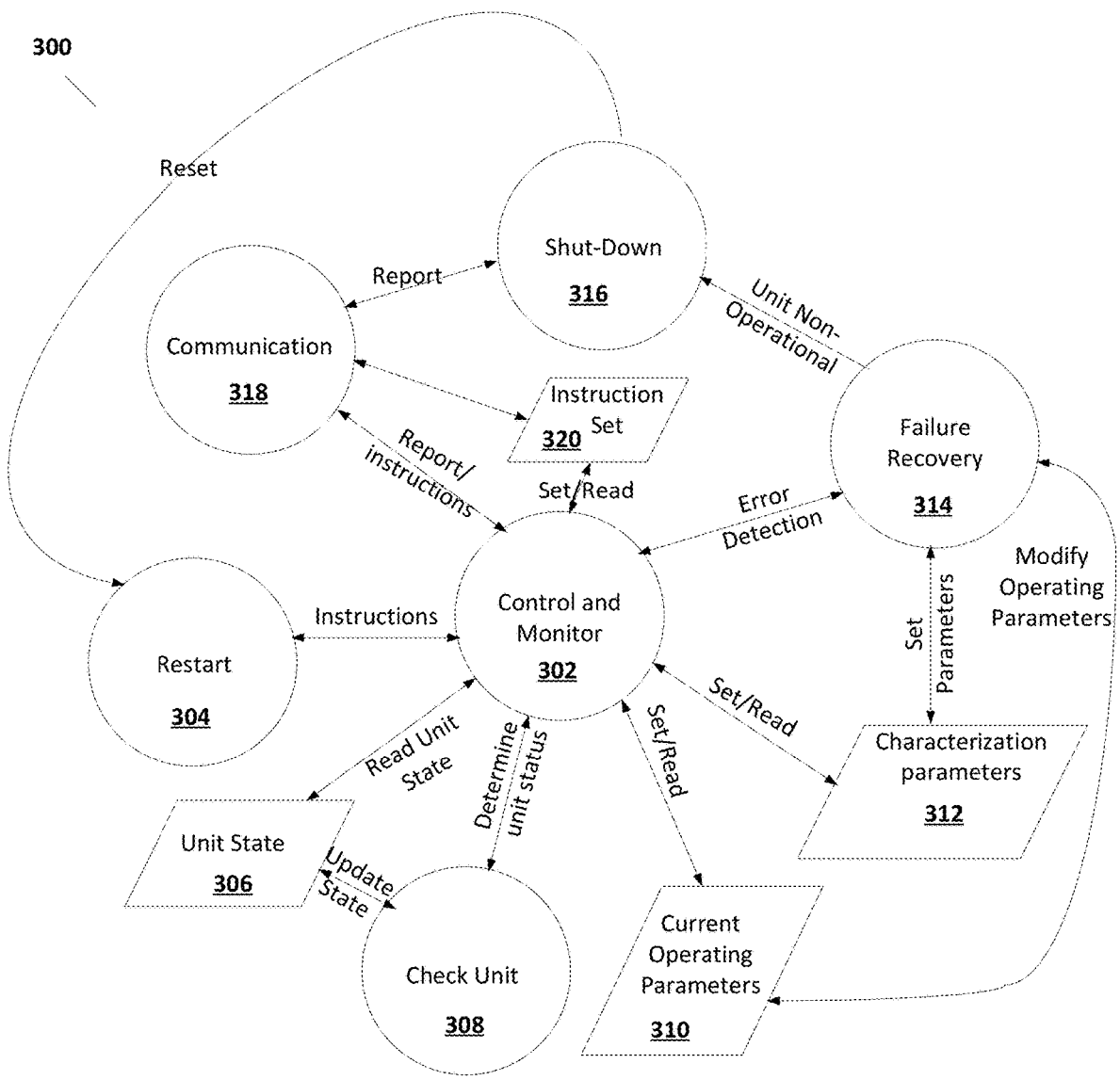
FIG. 3 illustrates example operation of an edge unit as shown in FIG. 2.

FIG. 3 depicts an example state function 300 illustrating operation of processing unit 202 of an edge unit 104. The state diagram 303 illustrated in FIG. 3 illustrates various states, which can in some examples be operating simultaneously. Some or all states may continuously operate while edge unit 104 is in operation.

As shown in FIG. 3, state function 300 includes a control and monitor state 302. In control and monitor state 302, processing unit 202 uses operating parameters read from data 310 and sends signals to power distribution section 204 according to those operating parameters to control individual devices (generators, storage units, output interfaces). Operating parameters can include, for example, power generation rate, storage rate, target storage level, load levels, grid power coupling levels, or other parameters used to control operation of the components of power distribution section 204. Operating parameters may be set by control and monitor 302 from instructions received from communication 318, which are stored in instruction set data 320, and may also depend on the current unit state read from unit state data 306.

Control unit 302 can receives instructions from a server 106, VPP 110, or other sources. In some embodiments, control unit 302 can determine from multiple sets of instructions a particular set to execute and may execute the chosen set of instructions. Operation of edge unit 104, including control unit 302, is further described in U.S. patent application Ser. No. 15/197,459, which is filed concurrently with the present application and is incorporated herein by reference in its entirety.

The instruction set stored in data 320 can include a sequential set of steps that edge unit 104 is instructed to perform. The instruction set stored in data 320 can include storage target level and storage rate, generation requirements, load parameter settings, and grid coupling settings. For example, the instruction set may include instructions to perform certain operations starting at certain times and having a duration of specific times (or ending at certain times), for example to discharge a certain power level to power grid 102 starting at a specific time and ending at a later specific time, or storing energy during a particular time frame, or generating power within a certain time period for storage or for supply to the grid, among other operations. Control and monitor 302 determines the operating parameters stored in current operating parameters data 310 consistently with instructions set stored in data 320 and the characterization parameters stored in characterization parameters 312.

As discussed above, characterization parameters stored in characterization parameters data 312 can include total energy storage characteristics, total power generation statistics, load characteristics (including load control parameters), grid coupling characteristics, efficiency characteristics, and parasitic loss characteristics. Some example parameter sets are illustrated in the following table I below.

TABLE I

| Characterization Parameters | Operating parameters | Current Unit State |
|---|---|---|
| Total energy storage, energy storage rate characteristics, energy storage leakage characteristics. | Storage target level and storage rate. | Current energy storage, current energy storage rate. |
| Total generation capability by generation source (e.g., diesel, solar, wind, other). | Generation requirement by generation source (e.g., diesel, solar, wind, other). | Current power generation by generation source, (e.g. diesel, solar, wind, other). |
| Load Characteristics, including characteristics of load controllability | Load parameters, settable load adjustment parameters. | Current Load drain. |
| Grid coupling characteristics (power available to grid, power receipt capabilities) Efficiency Characteristics Parasitic Loss Characteristics | Grid power settings | Current grid power |

Efficiency Characteristics can include, for example, DC-DC loss through, for example, a solar charge controller (SCC), DC-AC loss (e.g., inverter loss), AC-DC loss (e.g., inverter loss), or other efficiency losses due to energy conversion that may occur in the system. Parasitic losses refer to losses that occur throughout the system.

As shown in FIG. 3, control and monitor 302 is coupled to read the current unit state from unit state data 306 and send signals to power generation section 204 in order to meet the operating parameters stored in current operating parameters 310. In performing that task, control and monitor 302 may rely on the characteristics of edge unit 104 to model and predict the operation of power generation section 204 in order to control particular components of power generation section 204.

In some embodiments, control and monitor 302 may transition to check unit 308, which may itself continuously operate. Check unit 308 measures the current parameters of power distribution section 204 in order to update unit state data 306. In some embodiments, check unit state 308 may continuously operate to periodically update the current state stored in unit state data 306. In some embodiments, check unit 308 may be triggered to update the data in unit state data 306 by control and monitor state 302.

Control and monitor state 302 is further coupled to transition to communications state 318 to receive instructions or to report conditions of edge unit 104. Communications state 318 includes communications through user interface 220 or through communications interface 226. Communications through user interface 220, which is co-located with edge unit 104, allows a local operator or local device (such as meter 116, for example) to alter the operation of edge unit 104 by providing instructions to processor section 202. Communications through communications interface 226 allows edge unit 104 to receive operating instructions from a VPP such as VPP 110 or from a server such as server 106.

Communications state 318 may provide instructions to control and monitor 302 when instructions are received. The instructions may include requests to report the current state stored in unit state 306, the current operating parameters stored in operating parameters 310, or the characterization parameters stored in characterization parameters data 312. Control and Monitor state 302, upon request, sends the data for reporting to communication state 318. Further, communication state 318 may provide instructions to control and monitor state 302 to set new operating parameters in current operating parameters data 310. In such cases, control and monitor state 302 can set the requested operating parameters in current operating parameters data 310, provided they are consistent with the characterization parameters in characterization parameters data 312.

Additionally, communication state 318 may receive a set of instructions that provide multiple sets of instructions that are executed sequentially at specified times. In which case, control and monitor state 302 can reset the operating parameters of current operating parameters data 310 based on the sets of instructions stored in instruction set data 320 at the time specified by instruction set data 320.

In the event that an error in operation is detected in control and monitor state 302, then a transition to failure recover state 314 may result. Examples of errors that may occur include requiring operating parameters that exceed the characterizations of characterization parameters stored in data 312. Other examples include failure of devices, for example a power interface failure, power generation failure, storage failure, or other hardware failure in power distribution section 204. In failure recovery state 314, processor unit 202 determines whether a failure of a component of power distribution section 204 has occurred. If a failure has occurred, processor unit 202 may attempt to recover by resetting the individual component that produced the error. However, if no recovery of that component is possible, the processor unit 202 may adjust the characterization parameters stored in characterization parameters 312 to reflect the reduced capability of power distribution section 204 and return to control and monitor state 302 to continue operation of reduced capability of edge unit 104. Processor unit 202 may also adjust operating parameters to conform with the reduced capabilities reflected in the characterization parameters 312 and report the new characterization parameters out.

If the error is particularly severe, processor unit 202 may transition to a shut-down state 316. In shut-down state 316, a report is generated to communication state 318 to transmit a non-operational state to a server or VPP coupled to edge unit 104. Further, most, if not all, of components in power distribution section 204 can be turned off.

Shut-down state 316 may transition to restart 304 when an instruction to do so is received through communication 318. In some embodiments, a field technician may restart edge unit 104 from user interface 220 after repairing or replacing the component or components of power distribution section 204 that resulted in the error. In some cases, a request to restart, potentially with a reduced set of characterization parameters 312 and new set of operating parameters 310, may be received from a server or VPP through communications 318. In some embodiments, restart 304 may provide control and monitor 302 with a set of operating parameters for current operating parameters 310 which may be, for example, an idle or standby set. Once a restart is complete, control and monitor 302 may report characterization parameters stored in characterization parameters 312, operating parameters stored in current operating parameters 310, and the current state stored in unit state 306 through communications state 318.

In some embodiments, communication 318 may detect a lack of a communications link, for example to a server or a VPP. In some embodiments, when the communications link fails, edge unit 104 can continue to execute according to the instructions in instruction set data 320. In some embodiments, when the communication link fails, edge unit 104 can revert to a set of standard operating parameters and continue to function under the standard set or may transition to failure recovery 314, which may shut down edge unit 104 in shut down state 316.

Figure 4:
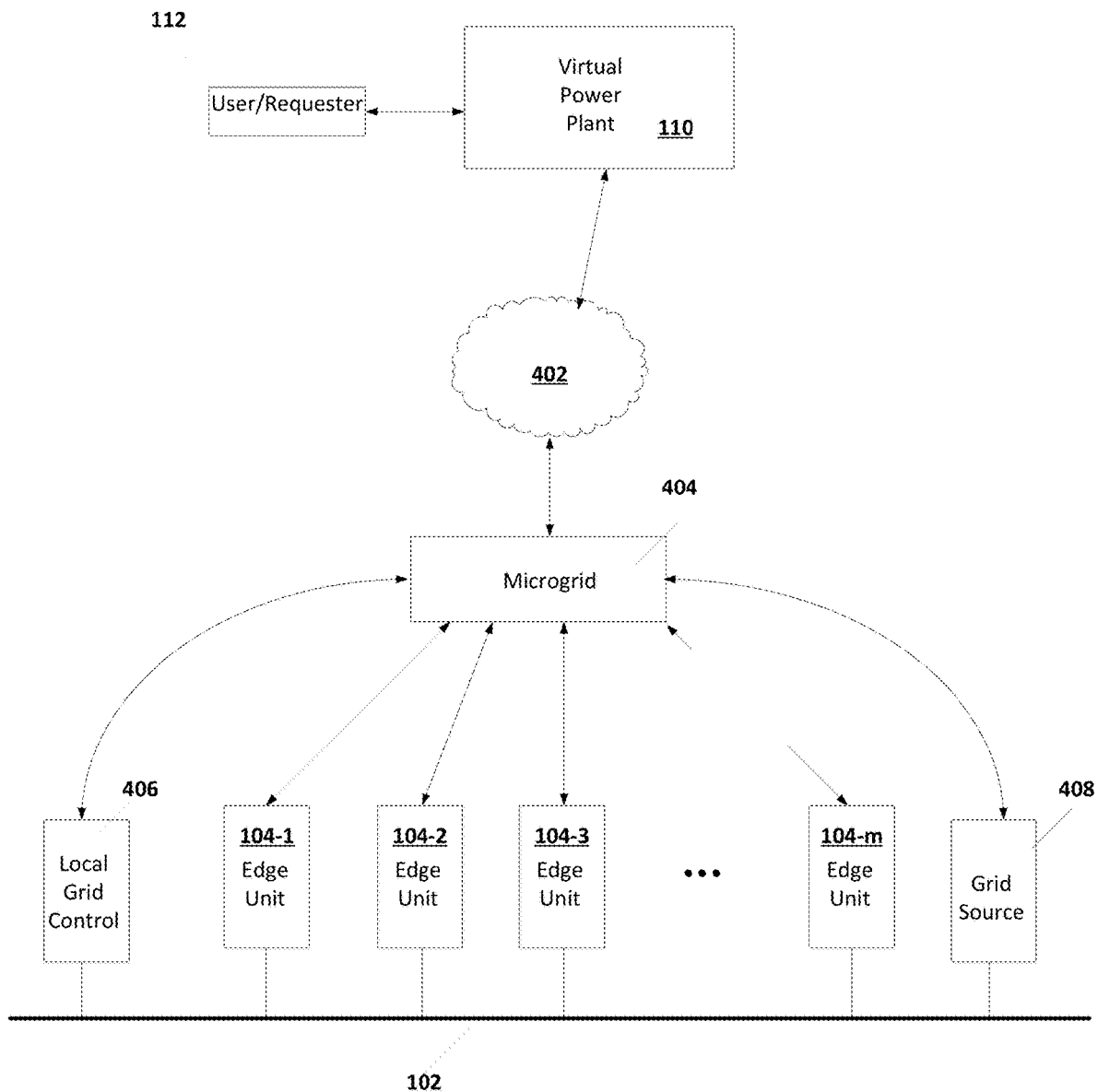
FIG. 4 illustrates a power distribution system as illustrated in FIG. 1 that emphasizes a microgrid controller according to some embodiments.

FIG. 4 illustrates an example of system 100 where server 106 is a microgrid controller 404 according to some embodiments. As shown in FIG. 4, microgrid controller 404 communicates with requestors such as, for example, VPP 110 through internet 402. In many cases, internet 402 is an unreliable medium and is often unavailable. In which case, microgrid controller 404 operates edge units 104-1 through 104-$m$ in a local autonomous mode without further instructions received or monitoring from internet 402, for example from VPP 110.

As is further illustrated in FIG. 4, microgrid controller 404 is coupled in a network adjacent fashion to edge units 104-1 through 104-$m$. Microgrid controller 404 may be coupled to any number of edge units 104-1 through 104-$m$. Although edge units 104-1 through 104-$m$ may be geographically distributed in any fashion, the communications links between microgrid controller 404 and edge units 104-1 through 104-$m$ are reliable network connections. In some embodiments, microgrid controller 404 may be directly hard-wired through any of a number of networking cables to each of edge units 104-1 through 104-$m$. In some embodiments, microgrid controller 404 may communicate to each of edge units 104-1 through 104-$m$ through a radio link. In some embodiments, communications between microgrid controller 404 and at least some of edge units 104-1 through 104-$m$ is relayed through others of edge units 104-1 through 104-$m$. In general, microgrid controller 404 communicates with edge units 104 without use of an internet based connection. Instead, microgrid controller 404 is network adjacent to each of edge units 104 by using local networking such as direct radio or RF based communications connections, physical cabling, or a combination of direct connections to edge units 104.

As is further illustrated in FIG. 4, microgrid controller 404 may also communicate with other grid components. As an example, FIG. 4 illustrates microgrid controller 404 communicating with a local grid controller 406 and a local grid source 408. In such way, microgrid controller 404 can operate according to tariff rules associated with the operation of grid 102. For example, if grid source 408 is a diesel generator that operates most efficiently at a particular power output (for example 80% output), microgrid controller 404 may operate such that the load from grid source 408 is maintained at its optimal setting.

Figure 5:
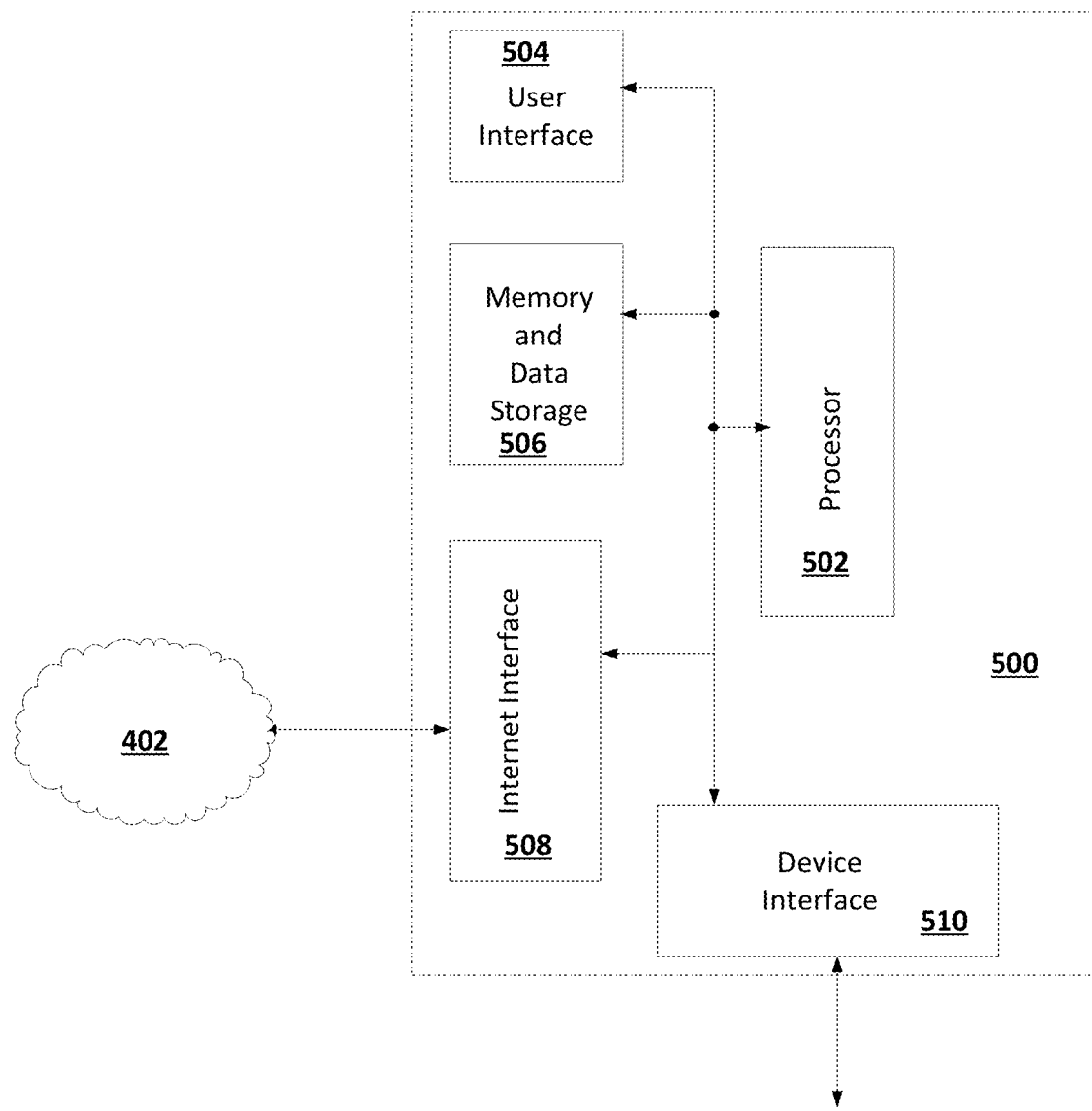
FIG. 5 illustrates an example of a server or microgrid controller as illustrated in FIGS. 1 and 3.

FIG. 5 illustrates an example of a device 500 that may be a microgrid controller such as microgrid controller 404. As shown in FIG. 4, device 500 includes a processor 502, a user interface 504, storage 506, a communications interface 508, and a device interface 510. Processor 502 includes one or more microprocessors or other devices capable of executing instructions. User interface 504 may be any display and input combination, for example touchscreen, keyboard, display, or other devices or collection of devices that allow a user to interface with device 500. Memory and data storage 506 can include any combination of one or more data storage devices, for example volatile or non-volatile memory, magnetic or optical disk drives, or any other device capable of storing data. Memory and data storage 506 may further include removable media such as magnetic disks, magnetic tape, optical disks, or portable solid-state memory devices. Memory and data storage 506 may be used to store data and instructions executed by processor 502.

Communications interface 508 may be any interface that couples to cloud internet 402 for communications with, for example, VPP 110. Communications interface 508 may communicate with any internet based devices that may request updates or provide instructions to device 500.

As is further illustrated in FIG. 5, device 500 as a microgrid controller 404 includes a device interface 510. Device interface 510 communications with any number of edge units 104, may communicate with local servers that communicate with edge units 104, or may communicate with grid components such as, for example, grid source 408 or local grid control 406. In some embodiments, communications interface 408 can couple to other devices through any combination of wireless interfaces, internet connectivity, physical wired networks, or through any other media utilizing any of the various protocols for data transmission available. Device interface 510 communicates with edge units 104 or other grid units such as grid controller 406 or grid source 408 as illustrated in FIG. 4 in a network adjacent fashion. As discussed above, device interface 510 may establish a network adjacent communications link using any directly connected mode of communication, for example radio transceivers, wired network interfaces, wireless network interfaces, or other communications interfaces to establish a direct, non-internet based, communications network with edge units 104-1 through 104-n and other grid units. In some embodiments, communications between device interface 510 and at least some of edge units 104 or grid components may be relayed through other edge units 104 or grid components. For example, a radio-based system may receive communications in one or more of edge units 104, which retransmit the communications to other ones of edge units 104. Such relaying may allow for an expansion of the geographic area which may be serviced by a single microgrid controller 404.

Figure 6:
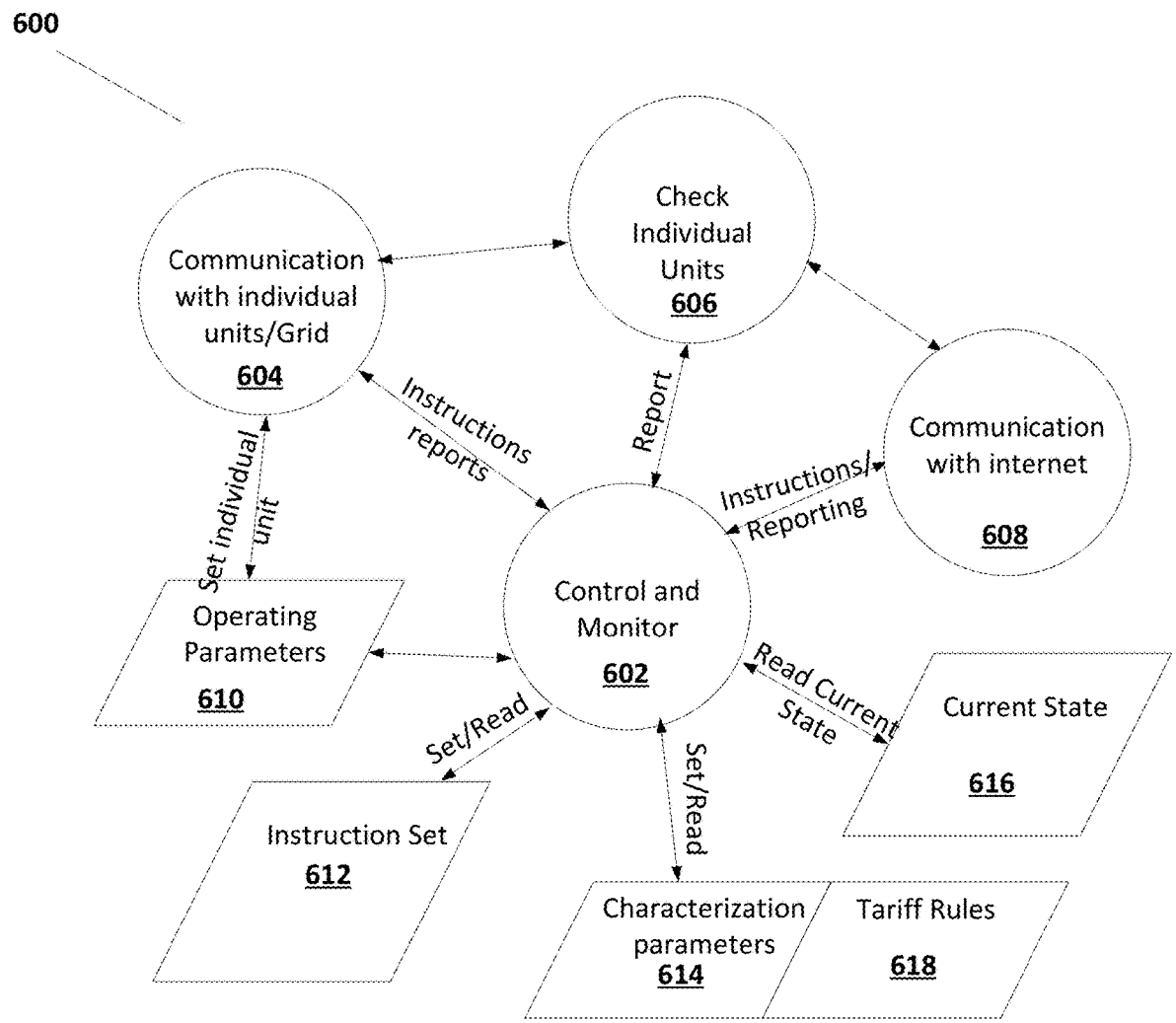
FIG. 6 illustrates operation of an example microgrid controller as illustrated in FIGS. 1 and 3.

FIG. 6 illustrates an example process 600 for operating device 500 as microgrid controller 404. As illustrated in FIG. 6, process 600 may include a control and monitor state 602. Control and monitor state 602 determines the operating parameters stored in operating parameters data 210 for each of the edge units 104-1 through 104-m coupled to microgrid controller 404 based on instructions stored in instruction set data 612. Instruction set data 612 may include instruction sets that are received through internet communications 608, which operates through internet interface 508, and/or default instruction sets that may be executed in the absence of communications through internet communications 608. In some embodiments, microgrid controller 404 the edge units 104-1 through 104-m coupled to microgrid controller 404 are considered to be a single VPP unit 124-1, as shown in FIG. 1. As such, control and monitor 502 determines a set of consolidated characterization parameters stored in characterization parameters data 614 for the consolidated set of edge units 104-1 through 104-m, along with storing individual characterization parameters for each of edge units 104-1 through 104-m.

Control and monitor state 602 can interact with communications state 604 in order to provide instructions to individual ones of edge units 104-1 through 104-m and receive reports from each of edge units 104-1 through 104-m. Control and Monitor state 602 may transition to a check individual units state 606, which interacts with communications state 604 to query each of the individual edge units 104-1 through 104-m regarding their status. Control and monitor state 602 or check individual units 606 then updates the current state stored in current state data 616. The current state stored in data 616 can include the current state of each of edge units 104-1 through 104-m coupled to server 106 and may further include the consolidated state of a single VPP unit 124-1 that includes the edge units 104-1 through 104-m.

Control and monitor state 602 may further transition to communications state 608 that communicates with another server or with a VPP, for example VPP 110 as illustrated in FIG. 1. Control and monitor state 602 can provide reports through communication state 608 and receive instructions from communications state 608. In some embodiments, microgrid controller 404 may receive instructions for each of the individual ones of edge units 104-1 through 104-m coupled to server 106, essentially treating each of edge units 104-1 through 104-m as an individual VPP unit. In some embodiments, microgrid controller 404 may receive instructions for the consolidated collection of servers 104-1 through 104-m, in which case microgrid controller 404 in control and monitor state 602 can determine the individual instructions for each of edge units 104-1 through 104-m based on the instructions for the consolidated unit 124-1. As such, instructions received through communication state 608, which may be individually targeted to individual ones of units 104-1 through 101-m or for the consolidated set of edge units 104-1 through 104-m, may be a sequential set of instructions and are stored in instruction set data 512.

In control and monitor state 602, microgrid controller 404 determines operating parameters that are then stored in operating parameters 610 for each of edge units 104-1 through 104-m based on the instructions received and stored in instruction set 612. In some embodiments, the operating parameters may be further informed by the tariff rules stored in tariff rules data 618.

Tariff rules stored in data 618 may be received from requestors through internet 402 or may be received from individual grid units that are in communication with microgrid controller 404. In some embodiments, Tariff rules stored in data 618 may be used to develop characterization parameters in characterization parameters data 614 that describe VPP unit 124-1.

The instructions stored in instruction set 612 include a schedule of activities for the group of edge units 104-1 through 104-m, either individually or directed towards the conglomerate of all of the edge units, that are coupled to microgrid controller 404. In some embodiments, control and monitor 602 may determine instructions for each of edge units 104-1 through 104-*m* based on instructions received for the conglomerate set of edge units 104-1 through 104-*m*. Control and monitor state 602 may also maintain characterization parameters stored in characterization parameters 614. Control and monitor state 602 further determines whether the current parameters to individual edge units 104-1 through 104-*m* are consistent with the characterization parameters stored in characterization parameters 614 and the current state stored in current state 616. If the instructions to any one of edge units 104-1 through 104-*m* cannot be performed because of an inconsistency with the current state or the characterization parameters for that unit, then control and monitor 602 may provide an error message to communication state 608 to prompt further instructions, or may modify operating parameters to individual units 104 autonomously if communications 608 is inoperative.

The characterization parameters stored in characterization parameters data 614 can include a set of characterization parameters as discussed above for each of edge unit 104-1 through 104-*m*. Further, control and monitor 602 may provide a consolidated set of characterization parameters that describe the capabilities of the consolidated set of edge units 104-1 through 104-*m*, including those restrictions placed on the operation of edge units 104-1 through 104-*m* in aggregate by tariff rules stored in tariff rules 618. In some embodiments, the consolidated set of characterization parameters may be reported on request to a VPP or other server, such as VPP 110, through communications 608 so that the consolidated set of edge units 104-1 through 104-*m* may be treated as a single unit, VPP unit 124-1, by requestors.

Control and monitor 602, along with check individual units 606, may further store the current state of each of edge units 104-1 through 104-*m* in current state data 616. Further, control and monitor state 602 may compile, from the current state of each of the edge units 104-1 through 104-*m*, the consolidated current state of the unit formed by consolidating the edge units 104-1 through 104-*m*.

Control and monitor 602 may provide reports to a VPP such as VPP 110 or other requestor by transitioning to communication state 608, provided that communication state 608 is active. These reports may include the characterization parameters stored in data 614, the current state parameters stored in data 616, the current instruction set stored in data 612, and the current operating parameters stored in data 610. These sets of parameters may include sets for each individual one of edge units 104-1 through 104-*m* that are coupled to microgrid controller 404 or they may be consolidated parameters treating the group of edge units 104-1 through 104-*m* as a single unit 124-1.

When communication state 608 determines that the internet connection is absent, or microgrid controller 404 is otherwise instructed to operate in an independent fashion, microgrid controller 404 operates edge units 104-1 through 104-*m* through communications 604 independently. In which case, microgrid controller 404 may continue operating with the last received instruction set stored in data 612 or may resort to default instruction sets instead. In some cases, microgrid controller 404 may place edge units 104-1 through 104-*m* into an idle state by providing the appropriate instructions through communications 604 to each of edge units 104.

Figure 7:
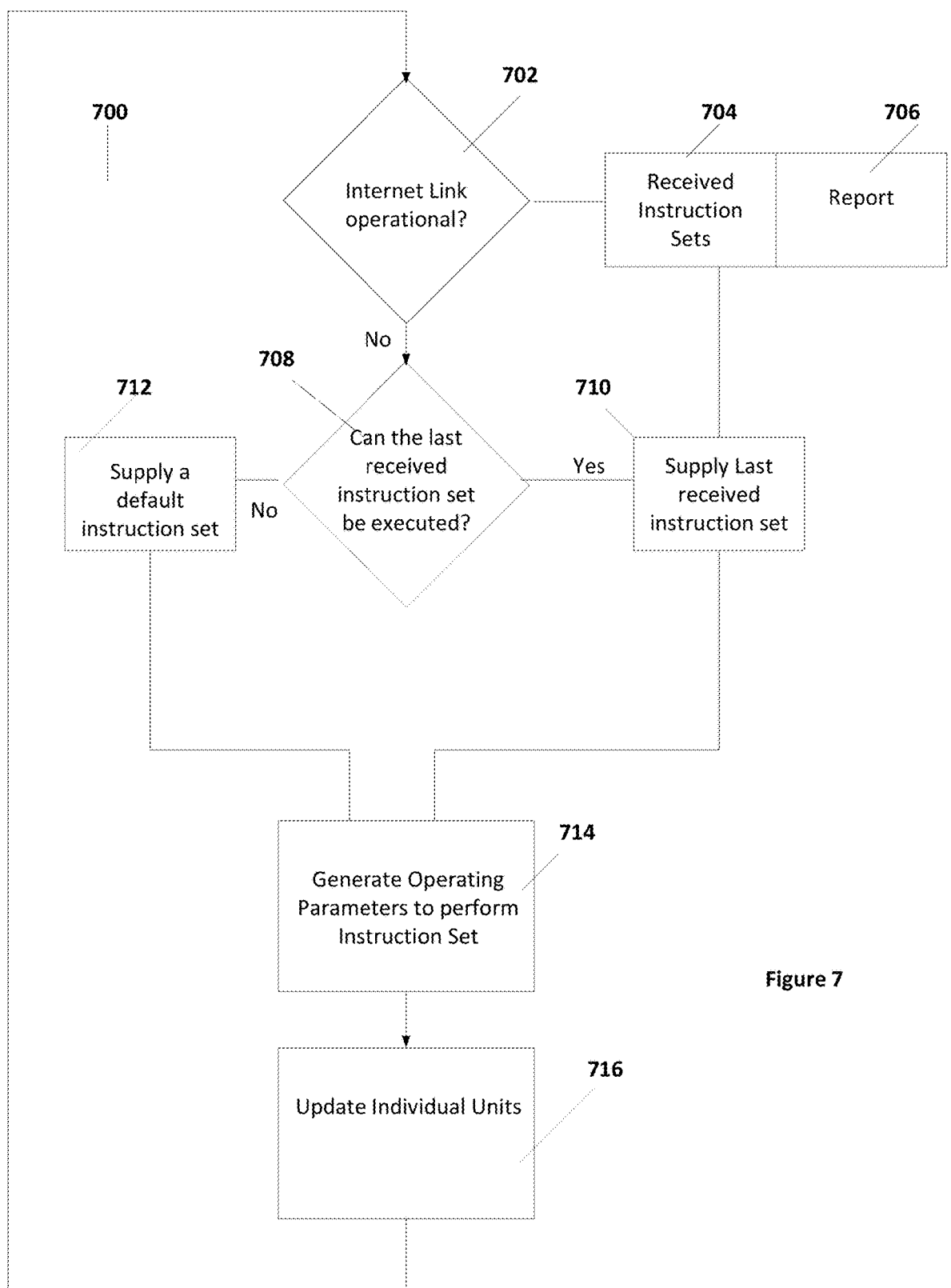
FIG. 7 further illustrates operation of aspects of the microgrid controller as illustrated in FIG. 6.

FIG. 7 illustrates an aspect of operation of control and monitor 602. As illustrated in FIG. 7, process 700 in step 702 checks communications 608 to determine if internet communications have been lost. If the internet is operational, then in step 704 the instruction sets in instruction set data 612 are updated if new instructions are received and in step 706 any reporting that is requested is performed. Process 700 then proceeds to step 710 where the received instruction set is supplied to step 714. However, if internet communications have been lost, then microgrid controller 404 operates in an autonomous fashion. In which case, process 700 proceeds to step 708 where a choice is made as to whether to continue with the last received instruction set or whether to supply other instructions to step 714.

In step 708, microgrid controller 404 can choose between a default instruction set 712 or to continue with the last received instruction set 704 in step 710. If the last received instruction set in 710 can be executed, then the last received instruction set 710 is provided to step 714 in step 710. However, if the last received instruction set 704 is no longer executable or has expired, then a default instruction set 712 is provided to step 714.

As is discussed, the instruction set as received in step 704 or provided in default instruction set 712 may be a set of instructions {S)} to be executed which take the form {(Must/May), (do nothing/charge/discharge), (at time T and hold for time t), (with priority p)}. As such, the instruction set may include a set of required instructions {SR} and a set of optional instructions {SO}. A preferred state is when the required instructions {SR} can be executed without executing any, or while executing few of, the optional instructions {SO}. In some sets, instructions set {S} may also include best-fit criteria {SB} to employ if the required instructions {SR} cannot be executed even if all of the optional instructions {SO} are executed. In step 708, microgrid controller determines whether the set of instructions {S} can be executed by edge units 104-1 through 104-*m*.

Figure 8:
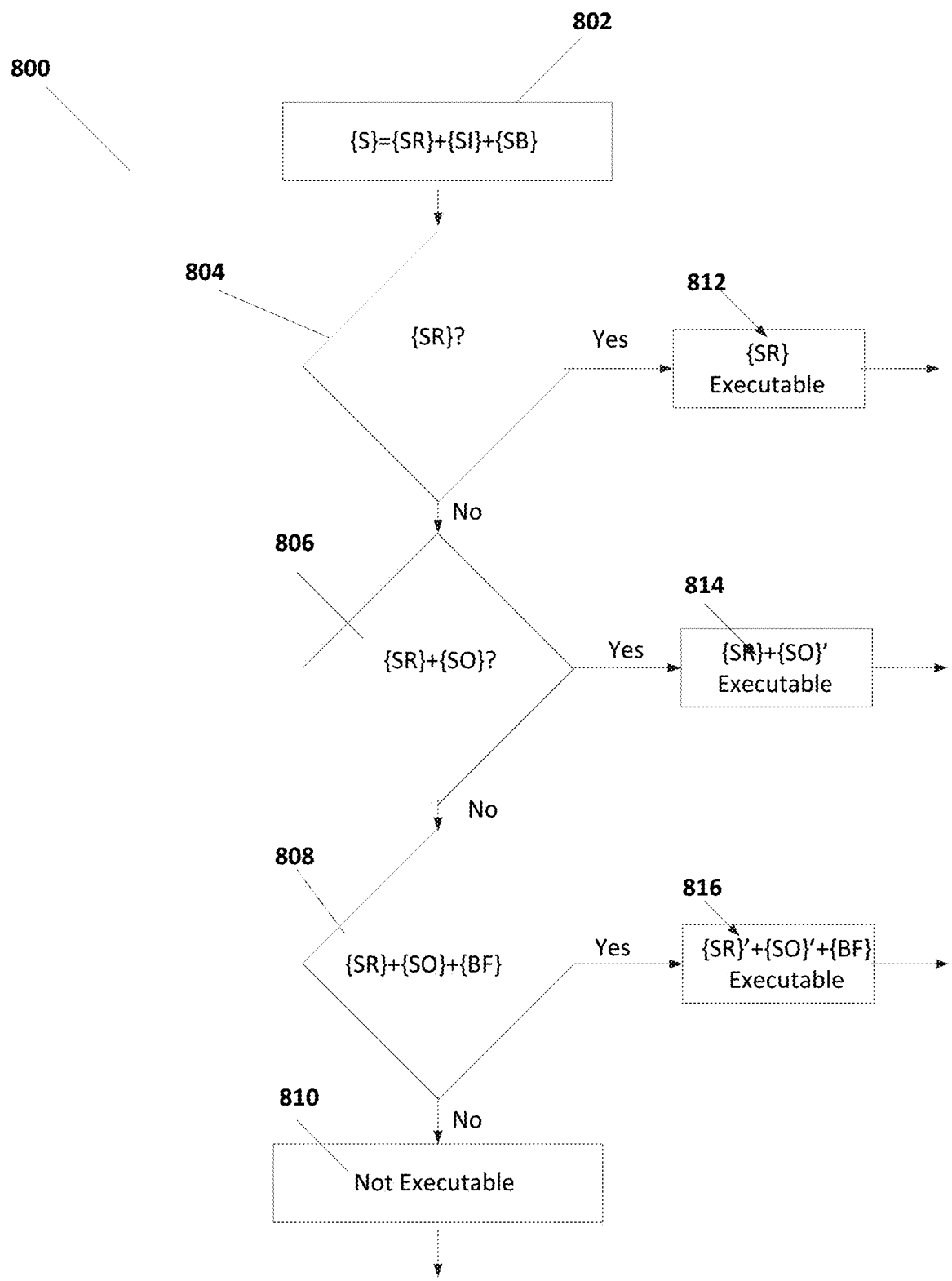
FIG. 8 illustrates an operational aspect of the example microgrid controller operation illustrated in FIG. 7.

FIG. 8 illustrates an example of the decision making process 800 for determining whether or not a particular set of instructions {S} can be executed by the resources available to microgrid controller 404. As described above, the resources available to microgrid controller 404 are determined by the characterization parameters data 614, current state data 616, and current operating parameters data 610. The resources available may also be dependent on adherence to tariff rules outlined in Tariff data.

As shown in FIG. 8, process 800 in step 802 receives an instruction set, which is typically of the form {S}={SR}+{SO}+{SB}. In step 804, process 800 determines whether, with the currently available resources, the required instructions {SR} can be performed. If they can, then process 800 proceeds to step 812 to confirm that the instructions {S} are executable and that the set {SR} should be executed. If not, the process 800 proceeds to step 806.

In step 806, process 800 determines whether, with the currently available resources, the required instructions {SR} can be performed if one or more of the optional instructions {SO} are performed. If they can, then process 800 proceeds to step 814 to confirm that the instructions {S} are executable and that the set {SR}+{SO}' should be executed, where {SO}' is the subset of optional instructions that are performed to all for performance of the set {SR}.

If the set {SR}+{SO} cannot be performed, then process 800 proceeds to step 808. In step 808 process 800 determines whether or not the set of instructions {SR}+{SO} can be partially fulfilled within the criteria set by the best fit rules {BF}. For example, since each of the required instructions in set {SR} may be assigned a priority, a best-fit rule may be to execute all instructions in {SR} with a priority over a particular value. Other best-fit rules may apply as well. If the set {S} can be performed within the best fit rules {BF}, then process 800 proceeds to step 816 where the set {SR}' and {SO}' that are determined to best fit the original set of instructions {S} may be executed. If more of the sets as described in steps 804, 806, and 808 can be executed, then process 800 proceeds to step 810 to indicate that the instruction set {S} is not executable.

Returning to FIG. 7, if in step 708 it is determined that the previously received instruction set has not expired and that the set of instructions can be expired, then the set of instructions determined, for example by process 800 illustrated in FIG. 8, is provided to step 714. However, if the set of received instructions cannot be executed, then process 700 proceeds to step 712.

In step 712, microgrid controller 404 operates autonomously to determine a set of instructions that should be executed. In some embodiments, in step 712 number of different sets of instructions may be considered before a set of instructions is chosen to perform. In some cases, process 800 illustrated in FIG. 8 may be used with the set of instructions to determine which of the number of different sets can be executed given the current resources available. In some embodiments, the number of different sets may be prioritized such that more desirable sets are considered first while less desirable sets are considered later until a set if found that can be executed. In some embodiments, microgrid controller 404 falls into a default set that maintains each of edge units 104 in a charging state or a maintenance state where load 106 is serviced.

Default instruction sets that may be included in step 712 may include instruction sets that provide load shifting, rate shifting, charging, or other functions that allow the consolidated set of edge units 104-1 through 104-m to operate on grid 102 and load 106. For example, solar charging may be used to acquire power throughout sunlight hours, which may be discharged to load 106 throughout the day.

In step 714, microgrid controller 404 determines a set of operating parameters based on the instruction set provided, the characterization parameters in data set 614 (including the tariff rules in data set 618), and the current state is indicated by data 616. In some embodiments, the enquiries made in steps 708, 710, and 712 may result in a worksheet of operating parameters. Step 714 may use the worksheet as a starting point for providing a set of operating parameters that allows edge units 104 to fulfill the chosen instruction set. In step 716, process 700 downloads operating instructions to individual ones of units 104-1 through 104-m to fulfill the instruction set.

The above detailed description is provided to illustrate specific embodiments of the present invention and is not intended to be limiting. Numerous variations and modifications within the scope of the present invention are possible. The present invention is set forth in the following claims.

What is claimed is:

1. A method of operating a microgrid controller of a microgrid, the microgrid including the microgrid controller coupled to one or more network adjacent edge units, the method, comprising:
communicating with the one or more network adjacent edge units in the microgrid to receive a set of characteristic parameters and current state parameters, the network adjacent edge units being coupled with the microgrid controller with a local area network, each of the one or more network adjacent edge units being coupled to a power grid, each edge unit including
a power distribution section that includes a power grid interface and at least one of a power generation interface, a power storage interface, and a load power interface, and
a processing unit that controls and monitors the power distribution section and communicates the set of characteristic parameters and current state parameters that characterize the edge unit to the microgrid controller, the processor determining from multiple sets of instructions a particular set to execute to control the power distribution section;
determining an instruction set to execute with the one or more network adjacent edge units, the instruction set being formed as a schedule of activities;
providing operating parameters based on the instruction set for each of the one or more network adjacent edge units to execute the instruction set; and
monitoring each of the one or more edge units to execute the instruction set.

2. The method of claim 1, wherein determining an instruction set to execute includes
choosing a received instruction set received through an internet connection if the internet connection remains active;
choosing a last received instruction set if the internet connection is inactive and the last received instruction set can be executed considering available resources;
choosing a default instruction set if the internet connection is inactive and the last received instruction set cannot be executed considering available resources.

3. The method of claim 2, further including choosing the default instruction set if the last received instruction set has expired.

4. The method of claim 2, wherein choosing the default instruction set includes determining one of a number of default instruction sets that can be executed considering available resources.

5. The method of claim 2, wherein considering the available resources includes evaluating characterization parameters of the one or more edge units, evaluating tariff rules associated with the grid, and the current set of the one or more edge units.

6. The method of claim 2, wherein the last received instruction set includes a set of required instructions and a set of optional instructions, and further including determining whether the last received instruction set can be executed, comprising:
determining whether the set of required instructions included in the last received instruction set can be executed;
if the set of required instructions cannot be executed, determining whether the set of required instructions can be executed if one or more of a set of optional instructions are executed; and
if the set of required instructions cannot be executed when one or more of the set of optional instructions are executed, determining whether a subset of the set of required instructions can be executed while executing one or more of a set of optional instructions that falls within criteria set by a set of best fit rules.

7. The method of claim 4, wherein each of the default instructions sets includes a set of required instructions and a set of optional instructions, and wherein determining one of a number of default instruction sets that can be executed includes evaluating each of the number of default instruction sets wherein evaluating one of the number of default instruction sets includes:
determining whether the set of required instructions included in the default instruction set can be executed;
if the set of required instructions cannot be executed, determining whether the set of required instructions can be executed if one or more of the set of optional instructions are executed; and if the required instructions cannot be executed when one or more of the set of optional instructions are executed, determining whether a subset of the required instructions can be executed while executing one or more of the set of optional instructions that falls within criteria set by a set of best fit rules.

8. The method of claim 1, wherein communicating with one or more network adjacent edge units includes providing a wired connection between the microgrid controller and at least some of the one or more network adjacent edge units.

9. The method of claim 1, wherein communicating with one or more network adjacent edge units includes providing a radio link between the microgrid controller and at least some of the one or more network adjacent edge units.

10. The method of claim 9, wherein each of the edge units can relay communications with the microgrid controller to other edge units through the radio link.

11. A microgrid controller, comprising:
a processor;
a memory coupled to the processor;
an internet interface coupled to the processor, the internet interface configured to communicate through an internet to receive instruction sets; and
a device interface coupled to the processor, the device interface configured to communicate with one or more network adjacent edge units, the network adjacent edge units communicating with the microgrid controller through a local area network, each of the edge units including
a power distribution section (204) that includes a power grid interface (208) to couple the edge unit with a power grid (102) and at least one of a power generation interface (210), a power storage interface (212), and a load power interface (214), and
a processing unit (202) that controls and monitors the power distribution section and communicates the set of characteristic parameters and current state parameters that characterize the edge unit to the microgrid controller, the processor determining from multiple sets of instructions (320) a particular set to execute to control the power distribution section;
wherein the processor executes instructions for
communicating with the one or more network adjacent edge units through the device interface to receive the set of characteristic parameters and current parameters from each of the one or more network adjacent edge units;
determining an instruction set to execute with the one or more network adjacent edge units, the instruction set being formed as a schedule of activities;
providing operating parameters based on the instruction set for each of the one or more network adjacent edge units to execute the instruction set; and
monitoring the one or more edge units.

12. The microgrid controller of claim 11, wherein the device interface interfaces to at least some of the one or more edge units with wired cables.

13. The microgrid controller of claim 11, wherein the device interface interfaces to at least some of the one or more edge units with a radio link.

14. The microgrid controller of claim 13, wherein the device interface provides instructions through the radio link to at least one of the one or more edge units, which relay the instructions to others of the one or more edge units.

15. The microgrid controller of claim 11, wherein determining an instruction set to execute includes
determining whether the internet interface is active;
choosing a received instruction set received through the internet interface if the internet connection remains active;
choosing a last received instruction set if the internet interface is inactive and the last received instruction set can be executed considering available resources;
choosing a default instruction set if the internet interface is inactive and the last received instruction set cannot be executed considering available resources.

16. The microgrid controller of claim 15, further including choosing a default instruction set if the last received instruction set has expired.

17. The microgrid controller of claim 15, wherein choosing a default instruction set includes determining one of a number of default instruction sets that can be executed considering available resources.

18. The microgrid controller of claim 15, wherein considering the available resources includes evaluating characterization parameters of the one or more edge units, evaluating tariff rules associated with the grid, and the current set of the one or more edge units.

19. The method of claim 15, wherein the last received instruction set includes a set of required instructions and a set of optional instructions, and further including determining whether the last received instruction set can be executed, comprising:
determining whether the set of required instructions included in the last received instruction set can be executed;
if the set of required instructions cannot be executed, determining whether the set of required instructions can be executed if one or more of a set of optional instructions are executed; and
if the set of required instructions cannot be executed when one or more of the set of optional instructions are executed, determining whether a subset of the set of required instructions can be executed while executing one or more of a set of optional instructions that falls within criteria set by a set of best fit rules.

20. The microgrid controller of claim 17, wherein each of the default instruction sets includes a set of required instructions and a set of optional instructions, and wherein determining one of a number of default instruction sets that can be executed includes evaluating each of the number of default instruction sets wherein evaluating one the number of default instruction sets includes:
determining whether the set of required instructions included in the default instruction set can be executed;
if the set of required instructions cannot be executed, determining whether the set of required instructions can be executed if one or more of the set of optional instructions are executed; and
if the required instructions cannot be executed when one or more of the set of optional instructions are executed, determining whether a subset of the required instructions can be executed while executing one or more of the set of optional instructions that falls within criteria set by a set of best fit rules.

* * * * *